United States Patent
Jerath et al.

(10) Patent No.: US 9,467,573 B2
(45) Date of Patent: *Oct. 11, 2016

(54) METHOD AND SYSTEM FOR ENABLING SHARED MOBILE DATA USAGE

(71) Applicant: Movirtu Limited, Slough (GB)

(72) Inventors: Rohit Jerath, Delhi (IN); Dingani Brian Nkala, Windsor (GB)

(73) Assignee: Movirtu Limited, Slough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,956

(22) Filed: Dec. 7, 2015

(65) Prior Publication Data

US 2016/0094723 A1    Mar. 31, 2016

Related U.S. Application Data

(63) Continuation of application No. 14/746,811, filed on Jun. 22, 2015, now Pat. No. 9,232,079, which is a continuation of application No. 14/064,545, filed on Oct. 28, 2013, now Pat. No. 9,065,935, which is a continuation of application No. 13/276,029, filed on Oct. 18, 2011, now Pat. No. 8,594,622.

(51) Int. Cl.
| | |
|---|---|
| *H04M 11/00* | (2006.01) |
| *H04M 15/00* | (2006.01) |
| *H04W 4/26* | (2009.01) |
| *H04W 12/06* | (2009.01) |
| *H04W 4/00* | (2009.01) |
| *H04W 4/24* | (2009.01) |
| *H04W 8/20* | (2009.01) |

(52) U.S. Cl.
CPC ........... *H04M 15/765* (2013.01); *H04M 15/41* (2013.01); *H04M 15/64* (2013.01); *H04M 15/8214* (2013.01); *H04W 4/003* (2013.01); *H04W 4/24* (2013.01); *H04W 4/26* (2013.01); *H04W 8/205* (2013.01); *H04W 12/06* (2013.01)

(58) Field of Classification Search
CPC .... H04W 76/021; H04W 88/16; H04W 8/18
See application file for complete search history.

(56) References Cited

U.S. PATENT DOCUMENTS

| | | | |
|---|---|---|---|
| 7,336,941 B1 | 2/2008 | Clingerman | ............ H04L 12/14 455/404.1 |
| 2005/0064845 A1 | 3/2005 | Clingerman | ............ H04L 63/08 455/408 |
| 2005/0277407 A1 | 12/2005 | Ahn et al. | |
| 2006/0274780 A1* | 12/2006 | Walsh | .................... H04L 12/189 370/458 |
| 2007/0105531 A1 | 5/2007 | Schroeder | ......... H04M 3/42008 455/411 |
| 2009/0017789 A1 | 1/2009 | Thomas et al. | |
| 2009/0227229 A1 | 9/2009 | Waller | .................... H04L 12/14 455/406 |
| 2011/0059738 A1 | 3/2011 | Waller | .................... H04W 8/26 455/433 |
| 2011/0194553 A1* | 8/2011 | Sahin | ...................... H04L 12/66 370/352 |

* cited by examiner

*Primary Examiner* — Khalid Shaheed
(74) *Attorney, Agent, or Firm* — Donna Flores; Fleit Gibbons Gutman Bongini & Bianco P.L.

(57) ABSTRACT

Disclosed is a system and method for enabling personalized shared mobile phone usage when accessing data services within a wireless telecommunications network, including an illustrative example application of the invention as it relates to mobile subscribers who cannot afford a mobile phone handset in emerging markets. For instance, a prepaid wireless subscriber can have a personal phone number associated with their own billing account, which can be used to access data services on a wireless network without needing to purchase any hardware, such as a mobile handset or SIM card. Thus, the subscriber may access his account and use data services through a borrowed handset.

18 Claims, 10 Drawing Sheets

METHOD AND SYSTEM FOR ENABLING SHARED MOBILE DATA USAGE

U.S. PATENT DOCUMENTS REFERENCED

U.S. patent application Ser. No. 12/214,902 by Waller (hereinafter "Waller"), filed on Mar. 4, 2008 and titled "Method and System for Enabling Personalized Shared Mobile Phone Usage," is hereby incorporated by reference in its entirety.

U.S. patent application Ser. No. 11/205,976 by Ahn et al. (hereinafter "Ahn"), filed on Aug. 17, 2005 and titled "Method and Device for Providing Mobile Services with Virtual Number," is hereby incorporated by reference in its entirety.

U.S. patent application Ser. No. 12/011,025 by Thomas et al. (hereinafter "Thomas"), files on Jan. 22, 2008 and titled "Point of Presence on a Mobile Network", is hereby incorporated by reference in its entirety.

TECHNICAL FIELD

This invention relates to a system and method for enabling personalized shared mobile phone usage when accessing data services within a wireless telecommunications network.

BACKGROUND

The specifications set out by The 3rd Generation Partnership Project (3GPP) define the operation of mobile voice and data services within a telecommunications network.

In a GSM mobile network, the subscriber is identified by his unique International Mobile Subscriber Identity (IMSI). The IMSI is stored on the subscriber's SIM card which is typically transportable and able to be removed and re-inserted into other mobile devices. The subscriber's phone number is known as the MSISDN. The combination of IMSI and MSISDN is held in a database maintained by the network operator known as the Home Location Register (HLR).

The General Packet Radio Service (GPRS) is a technology used in mobile networks to carry Internet Protocol (IP) packets across the network.

The roles of the Serving GPRS Support Node (SGSN) and Gateway GPRS Support Node (GGSN) are well defined in the 3GPP specifications and are familiar to persons skilled in the art. The term "3GPP specification" covers all GSM (including GPRS and EDGE), W-CDMA and LTE (including LTE-Advanced) specifications. The following terms are also used to describe networks using the 3G specifications: UTRAN, UMTS (in Europe) and FOMA (in Japan). Revised versions of these specifications are produced up to four times a year following the quarterly TSG plenary meetings and are publicly available for download at www.3GPP.org/specifications. All 3GPP specifications from the years 2000 through 2011 are hereby incorporated by reference in their entireties.

The GGSN is responsible for the interworking between the mobile GPRS network and external packet switched networks such as the Internet. Each SGSN is responsible for the delivery of data packets from and to the mobile stations within the geographical service area for which it is responsible.

GPRS tunneling protocol (GTP) is the protocol that allows end users of a GSM or WCDMA network to move from place to place while continuing to connect to the Internet. GTP carries the subscriber's data from the subscriber's current SGSN to the GGSN that is handling the subscriber's session. GTP data is transmitted in the form of Protocol Data Units (PDUs), otherwise known as G-PDUs.

When the mobile station wants to use GPRS, it must first attach and then activate a packet data protocol (PDP) context ("PDP context"). The PDP context is a data structure established on both the SGSN and the GGSN representing the subscriber's GPRS session information.

The Charging Gateway Function (CGF) is responsible for handling billing of the data packets consumed by the subscribers. The CGF listens to GTP messages sent by the GGSNs and SGSNs. The GTP messages contain Call Detail Records (also known as Call Data Records or CDRs) that are ultimately used to bill the subscribers. The information carried in the CDRs typically includes data session activation/deactivation times and the quantity of data that the subscriber has consumed.

Waller discloses a method and system for allowing subscribers who cannot afford to purchase their own mobile phone to borrow a mobile and make and receive calls and send/receive Short Message Service (SMS) messages using their own prepaid account. The service makes use of USSD (Unstructured Supplementary Service Data) commands to activate and deactivate the shared account and to access the various mobile services (such as placing and receiving calls, checking for missed calls and voicemails, and sending and receiving SMS messages). The method and system described herein further extends Waller's application with the additional benefit that the user is able to use mobile data services, such as browsing the Internet, on the borrowed mobile device using his own private account.

While examples of providing certain mobile services with a virtual number are disclosed in Ahn, what makes the method and system in the present application unique from Ahn is at least the ability to enable shared usage of mobile data services from a mobile device using a virtual IMSI.

In another invention, Thomas discloses the ability to enable shared data access, by enabling mobile data on a first device and setting up said first device to act as a point of presence in a network so that a second device may connect to the point of presence. Thomas' invention however, requires that the two devices to be connected to each other via a RF (radio frequency) interface.

SUMMARY

Throughout this application, the terms 'mobile station' and 'mobile device' are used, these may refer to any type of GSM device capable of sending or receiving data traffic over a 'GPRS', '3G', WIMAX or 'LTE' network or their equivalents or evolutions. Furthermore, a 'mobile device' could also refer to the device compliant with the emerging Machine 2 Machine ('M2M') specifications being developed by ETSI (the European Telecommunications Standards Institute).

A method and system are described herein that allow a mobile subscriber (i.e. phone lender) to lend his mobile device to a second user (i.e. phone borrower) on a temporary basis. The phone borrower can then utilize mobile data services on the borrowed device using his own billing account and own mobile phone number which is different from that of the phone lender.

In one embodiment in Waller, the phone lender uses USSD commands to detach his mobile number from the device, placing the device in a so-called 'Zombie' state. Said phone borrower then logs in and attaches his own mobile number to the device again using USSD commands, by entering his mobile number and PIN.

Having authenticated himself on the loaned device, said phone borrower may then use the borrowed device to browse the Internet and consume data services on his own mobile account connected to a virtual IMSI. The virtual IMSI and MSISDN combination is held in a special server in the network called MXNet Server. When said phone borrower has finished using the mobile device, the subscriber logs off the device using USSD commands and hands the device back to the phone lender. The exact process of logging in and logging off is fully described in Waller, which is incorporated by reference, and therefore is not described in detail here.

The concept of phone lending is not new; what is unique is the method and system described herein to allow data services to be consumed on a shared device using a virtual IMSI.

Other aspects, embodiments, and features will be apparent from the following description, the drawings, and the claims.

DETAILED DESCRIPTION

In one example, a software function is installed by the network operator hereinafter called "MXNet Server."

In a second example, the MXNet Server may reside as a functional software module located within a network element such as the GGSN, WAP Gateway or Mobile Internet Proxy.

In a third embodiment, the MXNet Server may reside as a functional software module within the Charging Group Function.

Figure 1:
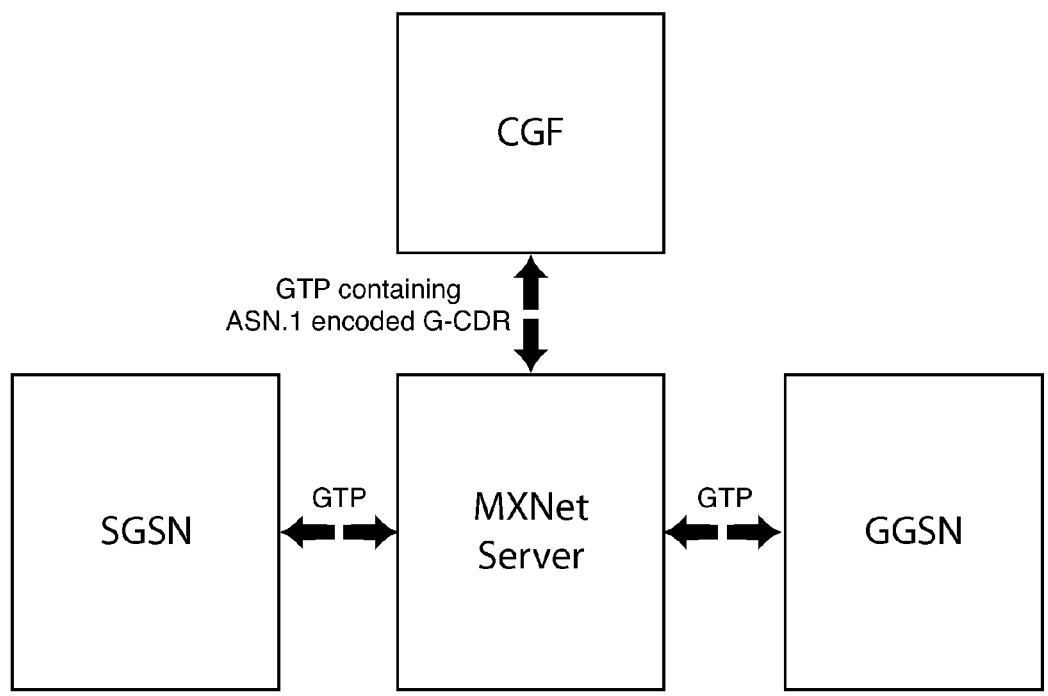
FIG. 1 is an overview diagram showing the relationship between MXNet Server and other related elements in the solution, SGSN, GGSN and CGF.

In all three embodiments, MXNet Server is logically placed in between the SGSN/GGSN and the CGF, see FIG. 1. The MXNet Server imitates a GGSN on behalf of an SGSN.

When the phone borrower has attached to the device using the method and process described in Waller, the "served IMSI" in the billing information sent by the SGSN/GGSN will still correspond to the phone lender's SIM, since the mobile device, SGSN, GGSN, HLR or CGF has no knowledge that the phone borrower's account is being used. Hence, in order to ensure that the correct account is billed, there is a need to replace the served IMSI in the CDR sent by the SGSN/GGSN with the virtual IMSI relating to the phone borrower's account, prior to sending the CDR to the CGF.

In the sections that follow, various mobile data charging scenarios are described which describe the method and process with which MXNet Server replaces the IMSI of the phone lender within the virtual IMSI (VIMSI) of the phone borrower. The scenarios described are given by way of example. The scenarios can be extended to include any and all other charging related scenarios that might be relevant within the scope of the invention.

Two systems and methods are described herein for achieving the replacement of the IMSI with VIMSI, and are called "Method 1" and "Method 2".

Call Detail Records (CDRs)

Upon certain chargeable events, which are described in detail in the following sections, the MXNet Server sends a Data Record Transfer Request message towards the Charging Gateway Function (CGF) comprising the parameters needed for billing in the form of a Call Detail Record (CDR). It is not necessary to list here all of the parameters which are sent in the CDR. However, the important parameter to note is the "served IMSI" since this is the parameter which is replaced by the MXNet Server causing the CGF to bill the phone borrower's account and not that of the phone lender.

1. Method 1

1.1 Successful Context Creation and Data Transfer

Figure 2:
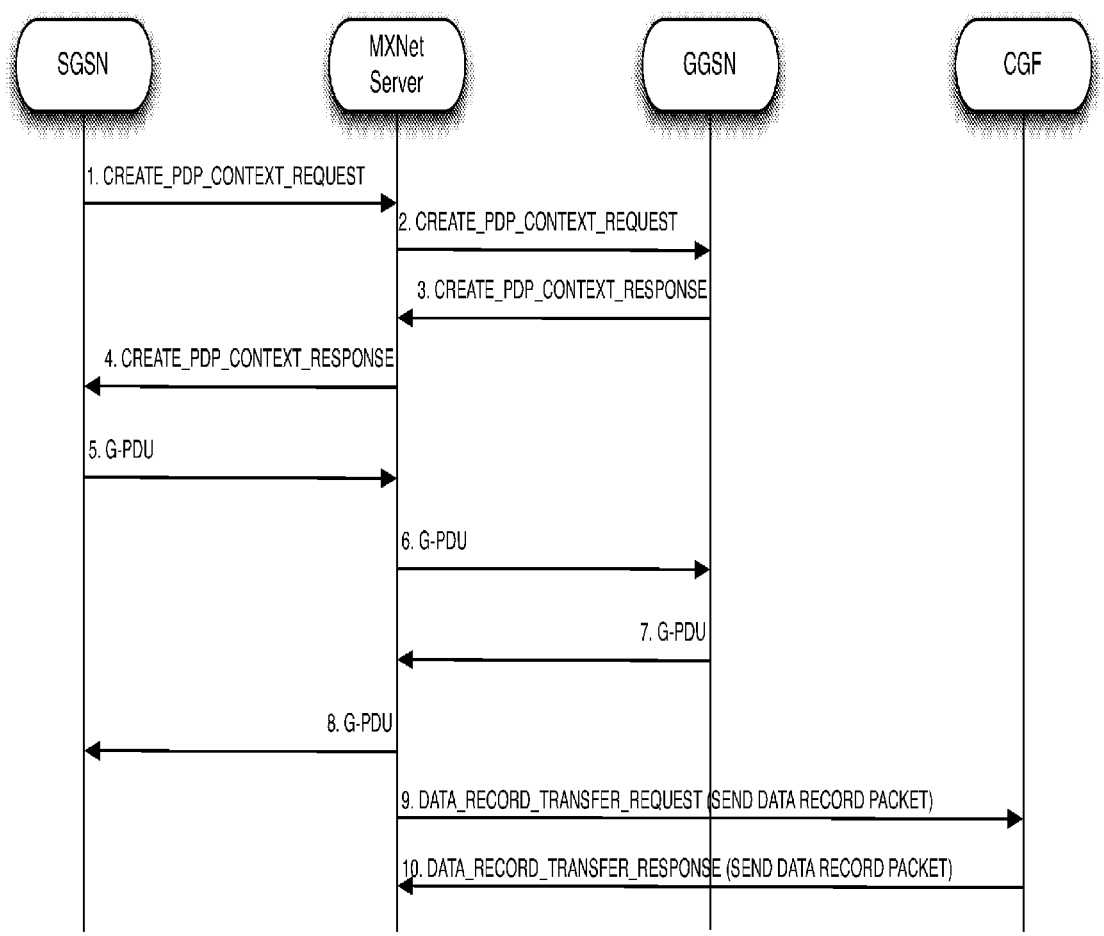
FIG. 2 is a signal flow diagram of the "Successful context creation and data transfer" scenario.

Reference is made to FIG. 2, which shows an example system and method for context creation and data transfer. In step 1, a SGSN sends a first Create PDP Context Request Message to a MXNet Server. The MXNet Server imitates a real GGSN and receives the first Create PDP Context Request message. The MXNet Server analyses PDP context information in the first Create PDP Context Request message to obtain, for example, the following parameters: Served IMSI, SGSN Address, APN Identifier, PDP type, Dynamic Address flag, Charging characteristics, and a SGSN PLMN identifier. These parameters are retrieved and stored so that a correct CDR can be generated. In step 2, the MXNet Server sends a second Create PDP Context Request message towards the GGSN using the parameters intercepted from the SGSN. The second message differs from the first message in that the Served IMSI is replaced with the Virtual IMSI of the phone borrower. In step 3, the GGSN sends a first Create PDP Context Response message towards the SGSN after allocating the dynamic address, and this message is intercepted by the MXNet Server. The MXNet Server analyses the PDP context information in the first Create PDP Context Response message and fetches, for example, the following parameters: GGSN Address used, Served PDP Address, and Record Opening time. In step 4, the MXNet Server then sends a second Create PDP Context Response message to the SGSN. In step 5, a first G-PDU is sent by the SGSN toward the MXNet Server containing uplink data. The MXNet Server extracts the volume of data sent in the uplink direction from the first G-PDU. The extracted information in the G-PDU is used for filling the "list of traffic data volumes" parameter of the G-CDR. In step 6, the MXNet Server then forwards a second G-PDU to the GGSN. In step 7, a first G-PDU is sent by the GGSN toward the MXNet Server containing the downlink data. The MXNet Server extracts the volume of data sent in the downlink direction from the G-PDU. This information is used for filling the "list of traffic data volumes" parameter of the G-CDR. In step 8, the MXNet Server then forwards a second G-PDU to the SGSN. In step 9, MXNet Server then sends the Data Record transfer Request towards the CGF containing the charging information, and in step 10, the MXNet Server receives a Data Record Transfer Response message from the CGF.

1.2 Addition of Container as Quality of Service (QoS) Class is Modified.

Figure 3:
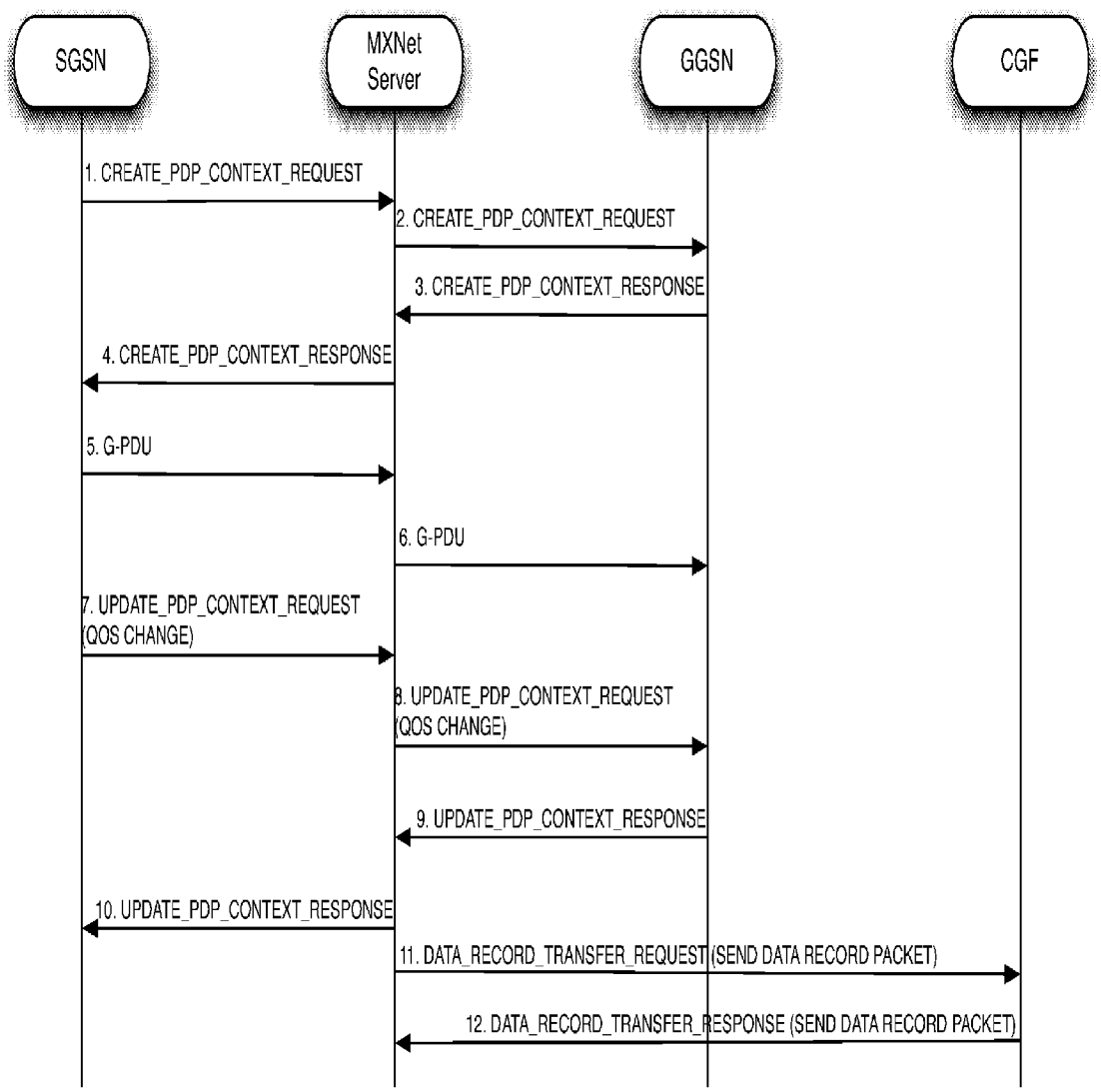
FIG. 3 is a signal flow diagram of the "Addition of container as QoS class is modified" scenario.

Reference is made to FIG. 3, which shows an example system and method for adding a container as a QoS class is modified. In step 1, a SGSN sends a first Create PDP Context Request Message toward a MXNet Server. The MXNet Server imitates a GGSN and receives the first Create PDP Context Request Message. The MXNet Server retrieves PDP context information from the first Create PDP Context Request Message. This retrieval is performed in order to fetch the following parameters, for example, so that a G-CDR may be generated: Served IMSI, SGSN Address, APN Identifier, PDP type, Dynamic Address flag, charging characteristics, and a SGSN PLMN identifier. In step 2, the MXNet Server sends a second Create PDP Context Request message towards the GGSN using the parameters intercepted from the SGSN. In the second Create PDP Context Request message, the Served IMSI is replaced with the Virtual IMSI of the phone borrower. In step 3, the GGSN sends a first Create PDP Context Response message towards the MXNet Server after allocating the dynamic address. The MXNet Server retrieves the following parameters, for example, from the first Create PDP Context Response message so that a G-CDR may be generated: GGSN Address used, Served PDP Address, and Record Opening time. In step 4, the MXNet Server sends a second Create PDP Context Response message towards the SGSN using the parameters intercepted from the GGSN. In step 5, a first G-PDU is sent by the SGSN toward the MXNet Server containing the uplink data. The MXNet Server extracts the "volume of data" parameter sent in the uplink direction. The extracted information is used for filling the "list of traffic data volumes" parameter of the G-CDR. In step 6, the MXNet Server forwards a second G-PDU to the GGSN. In step 7, SGSN sends a first Update PDP Context Request message to the MXNet Server indicating a new Quality of Service (QoS) value. The MXNet Server updates the new QoS value in its database associated with the subscriber's Virtual IMSI. In step 8, the MXNet Server forwards a second Update PDP Context Request message to the GGSN indicating the new QoS. In step 9, the GGSN sends back a first Update PDP Context Response message to the MXNet Server. The MXNet Server compares a negotiated QoS value with the last stored value in its database. If the QoS values are different, the MXNet Server replaces the stored QoS value with the new QoS value received in the first Update PDP Context Response Message. In step 10, the MXNet Server sends a second Update PDP Context Response Message to the SGSN. In step 11, the MXNet Server sends a Data Record Transfer Request towards the CGF specifying a new container with the new QoS value in the "list of traffic data volumes" parameter of the G-CDR. In step 12, the MXNet Server receives a Data Record Transfer Response sent from the CGF.

1.3 Delete Request Triggering G-CDR.

Figure 4:
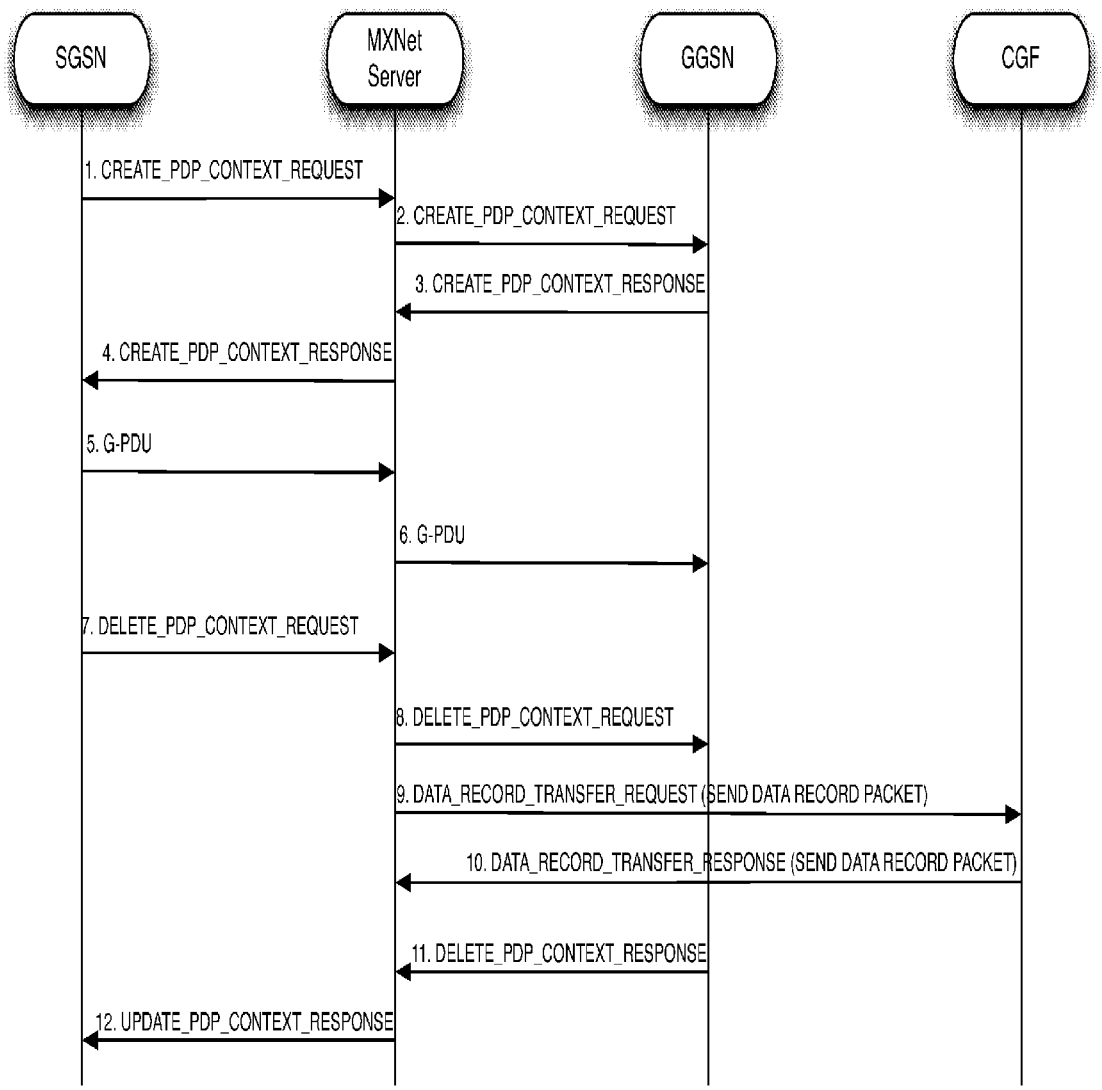
FIG. 4 is a signal flow diagram of the "Delete Request Triggering CDR" scenario.

Reference is made to FIG. 4, which shows an example system and method for triggering a G-CDR using a delete request. In step 1, the SGSN sends a first Create PDP Context Request message toward the MXNet Server. The MXNet Server imitates the GGSN and receives the first Create PDP Context Request message. The MXNet Server retrieves PDP context information from the first Create PDP Context Request message. This retrieval is performed in order to fetch the following parameters, for example, so that a G-CDR may be generated: Served IMSI, SGSN Address, APN Identifier, PDP type, Dynamic Address flag, Charging characteristics, and a SGSN PLMN identifier. In step 2, the MXNet Server sends a second Create PDP Context Request message towards the GGSN using the parameters intercepted from the first Create PDP Context Request message sent from the SGSN. The second Create PDP Context message is similar to the first Create PDP Context message, except that a Served IMSI is replaced with a Virtual IMSI of the phone borrower. In step 3, the GGSN sends a first Create PDP Context Response message towards the MXNet Server after allocating the dynamic address. The MXNet Server retrieves the following parameters, for example, from the first Create PDP Context Response message so that a G-CDR may be generated: GGSN Address used, Served PDP Address, and Record Opening time. In step 4, the MXNet Server sends a second Create PDP Context Response message towards the SGSN using the parameters intercepted from the first Create PDP Context Response message from the GGSN. In step 5, the G-PDU is sent by the SGSN toward the MXNet Server containing the uplink data. The MXNet Server extracts the "volume of data" parameter sent in the uplink direction. The extracted information is used for filling the "list of traffic data volumes" parameter of the G-CDR. In step 6, the MXNet Server forwards a second G-PDU to the GGSN. In step 7, a first Delete PDP Context Request message is sent by the SGSN to the MXNet Server. In step 8, the MXNet Server forwards a second Delete PDP Context Request message to the GGSN. In step 9, the MXNet Server then sends a Data Record Transfer Request to the CGF containing the charging information. In step 10, the CGF sends a Data Record Transfer Response message to the MXNet Server. In step 11, MXNet Server receives a first Delete PDP Context Response message from the GGSN. In step 12, the MXNet Server forwards a second Delete PDP Context Response message to the SGSN.

1.4 Change in Restart Counter at GGSN Causing G-CDR Generation.

Figure 5:
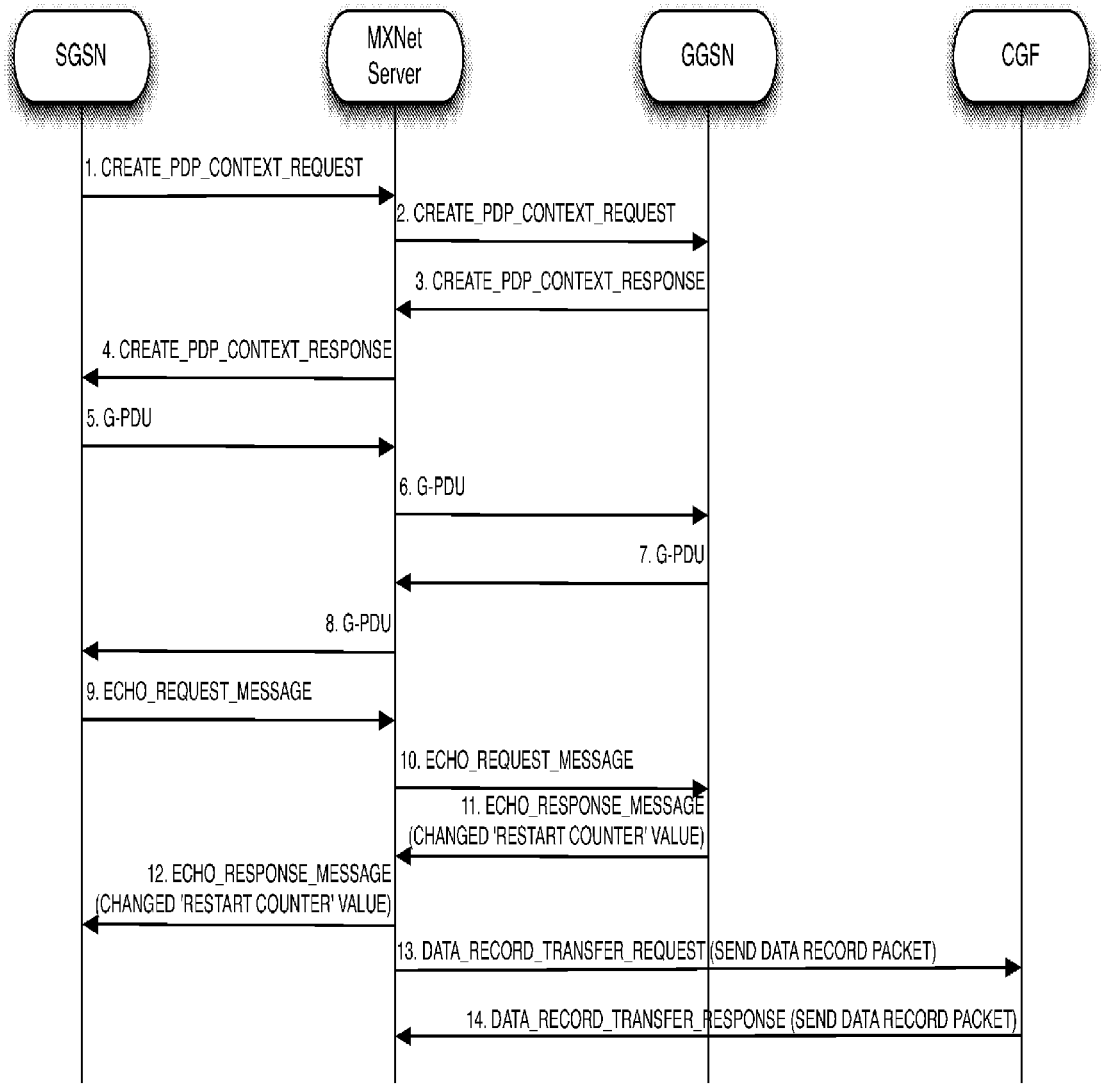
FIG. 5 is a signal flow diagram of the "Change in restart counter at GGSN causing CDR generation" scenario.

Reference is made to FIG. 5, which shows an example system and method for causing a G-CDR generation by changing a restart counter at a GGSN. In step 1, the SGSN sends a first Create PDP Context Request message toward a MXNet Server. The MXNet Server imitates the GGSN and receives the first Create PDP Context Request message. The MXNet Server retrieves PDP context information from the first Create PDP Context Request message. This retrieval is performed in order to fetch the following parameters, for example, so that a G-CDR may be generated: Served IMSI, SGSN Address, APN Identifier, PDP type, Dynamic Address flag, Charging characteristics, and a SGSN PLMN identifier. In step 2, the MXNet Server sends a second Create PDP Context Request message to the GGSN using the parameters intercepted from the first Create PDP Context Request Message sent from the SGSN. The second Create PDP Context message is similar to the first Create PDP Context message, except that the Served IMSI is replaced with the Virtual IMSI of the phone borrower. In step 3, the GGSN sends a first Create PDP Context Response message towards the MXNet Server after allocating the dynamic address. The MXNet Server retrieves the following parameters, for example, from the first Create PDP Context Response message so that a G-CDR may be generated: GGSN Address used, Served PDP Address, and Record Opening time. The MXNet Server sends a second Create PDP Context Response message to the SGSN using the parameters intercepted from the first Create PDP Context Response message from the GGSN. In step 5, a first G-PDU is sent by the SGSN toward the MXNet Server containing the uplink data. The MXNet Server extracts the "volume of data" parameter sent in the uplink direction. This information is used for filling the "list of traffic data volumes" parameter of the G-CDR. In step 6, the MXNet Server forwards a second G-PDU to the GGSN. In step 7, a first G-PDU is sent by the GGSN to the MXNet Server containing the downlink data. The MXNet Server extracts the "volume of data" sent in the downlink direction from the first G-PDU Response. The extracted information is used for filling the "list of traffic data volumes" parameter of the G-CDR. In step 8, the MXNet Server forwards a second G-PDU to the SGSN. In step 9, a first Echo Request message is intercepted by the MXNet Server. The MXNet Server retrieves a "restart value" from the first Echo Request message. In step 10, the MXNet Server sends a second Echo Request message to the GGSN. In step 11, the GGSN sends a first Echo Response message to the MXNet Server. On receipt of the first Echo Response message, the MXNet Server compares the "restart value" in the Echo Response message with a stored value. If the values are different, then CDRs are triggered for all contexts associated with the GGSN. In step 12, the MXNet Server sends a second Echo Response message to the SGSN. In step 13, a Data Record Transfer Request is sent by the MXNet Server to the CGF. In step 14, the MXNet Server receives a Data Record Transfer Response message from the CGF.

1.5 Change in Restart Counter at SGSN Causing G-CDR Generation.

Figure 6:
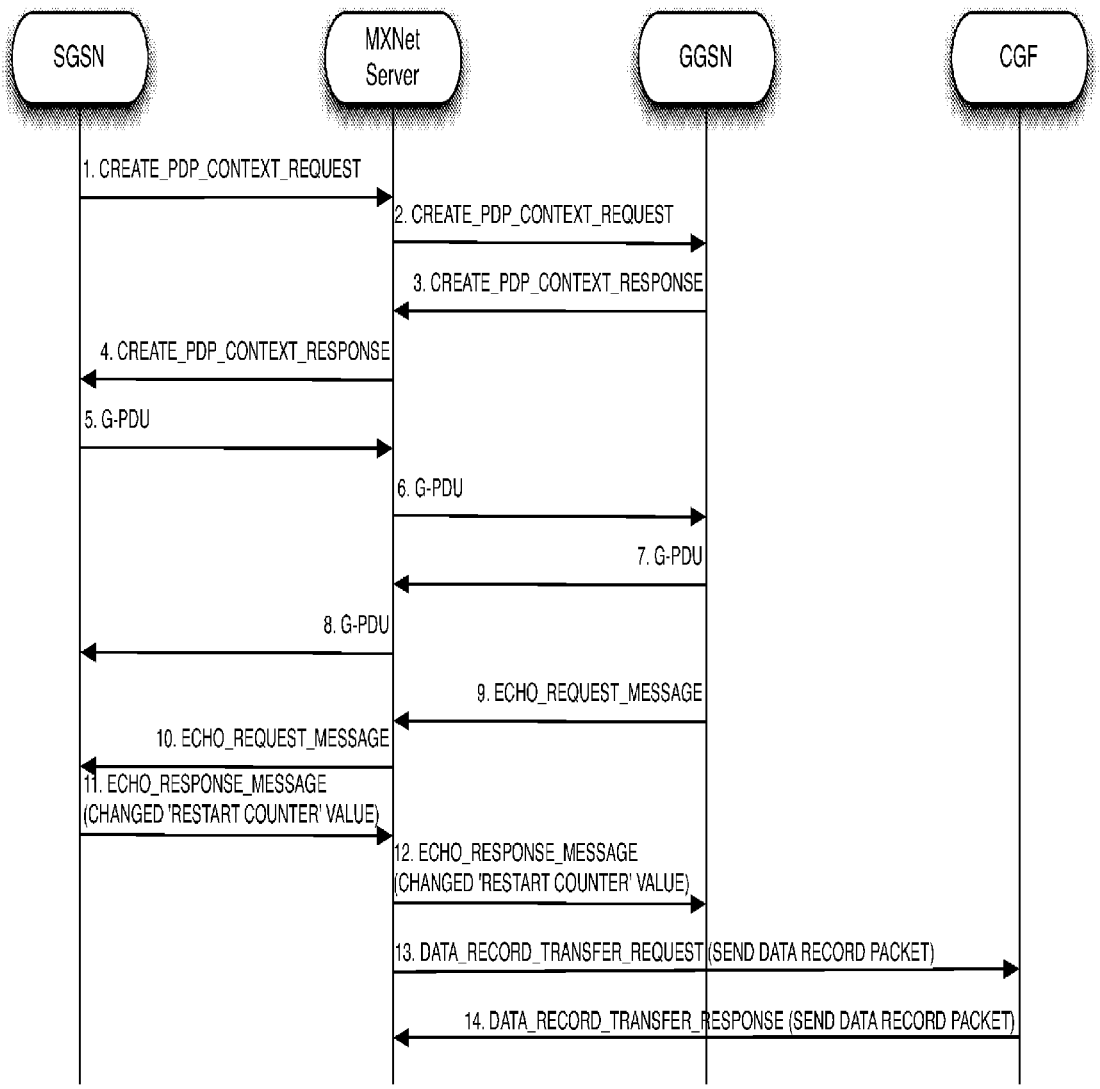
FIG. 6 is a signal flow diagram of the "Change in restart counter at SGSN causing CDR generation" scenario.

Reference is made to FIG. 6, which shows an example system and method for causing a G-CDR generation by changing a restart counter at a SGSN. In step 1, a SGSN sends a first Create PDP Context Request message toward a MXNet Server. The MXNet Server imitates the GGSN and receives the first Create PDP Context Request message. The MXNet Server retrieves PDP context information from the first Create PDP Context Request message. This retrieval is performed in order to fetch the following parameters, for example, so that a G-CDR may be generated: Served IMSI, SGSN Address, APN Identifier, PDP type, Dynamic Address flag, Charging characteristics, and a SGSN PLMN identifier. In step 2, the MXNet Server sends a second Create PDP Context Request message to the GGSN using the parameters intercepted from the first Create PDP Context Request message sent from the SGSN. The second Create PDP Context Request message is similar to the first Create PDP Context Request message except that the Served IMSI is replaced with the Virtual IMSI of the phone borrower. In step 3, the GGSN sends a first Create PDP Context Response message to the MXNet Server after allocating the dynamic address. The MXNet Server retrieves the following parameters, for example, from the first Create PDP Context Response message so that a G-CDR may be generated: GGSN Address used, Served PDP Address, and Record Opening time. In step 4, the MXNet Server sends a second Create PDP Context Response message to the SGSN using the parameters intercepted from the first Create PDP Context Response message sent from the GGSN. In step 5, a first G-PDU is sent by the SGSN toward the MXNet Server containing the uplink data. The MXNet Server extracts the "volume of data" parameter sent in the uplink direction. This information is used for filling the "list of traffic data volumes" parameter of the G-CDR. In step 6, the MXNet Server forwards a second G-PDU to the GGSN. In step 7, a first G-PDU is sent by the GGSN toward the MXNet Server containing the downlink data. The MXNet Server extracts the "volume of data" sent in the downlink direction from the first G-PDU. The extracted information is used for filling the "list of traffic data volumes" parameter of the G-CDR. In step 8, the MXNet Server forwards a second G-PDU to the SGSN. In step 9, a first Echo Request message sent from the GGSN is intercepted by the MXNet Server. The MXNet Server retrieves the "restart value" from the first Echo Request message. In step 10, the MXNet Server sends a second Echo Request message to the SGSN. In step 11, on receipt of a first Echo Response message from the SGSN, the MXNet Server compares the "restart value" in the first Echo Response message with a stored value. If the values differ, then CDRs are triggered for all contexts associated with this SGSN. In step 12, the MXNet Server sends a second Echo Response message to the GGSN. In step 13, the MXNet Server sends a Data Record Transfer Request to the CGF. In step 14, the CGF sends a Data Record Transfer Response to the MXNet Server.

1.6 Error Indication from SGSN Triggering G-CDR Creation.

Figure 7:
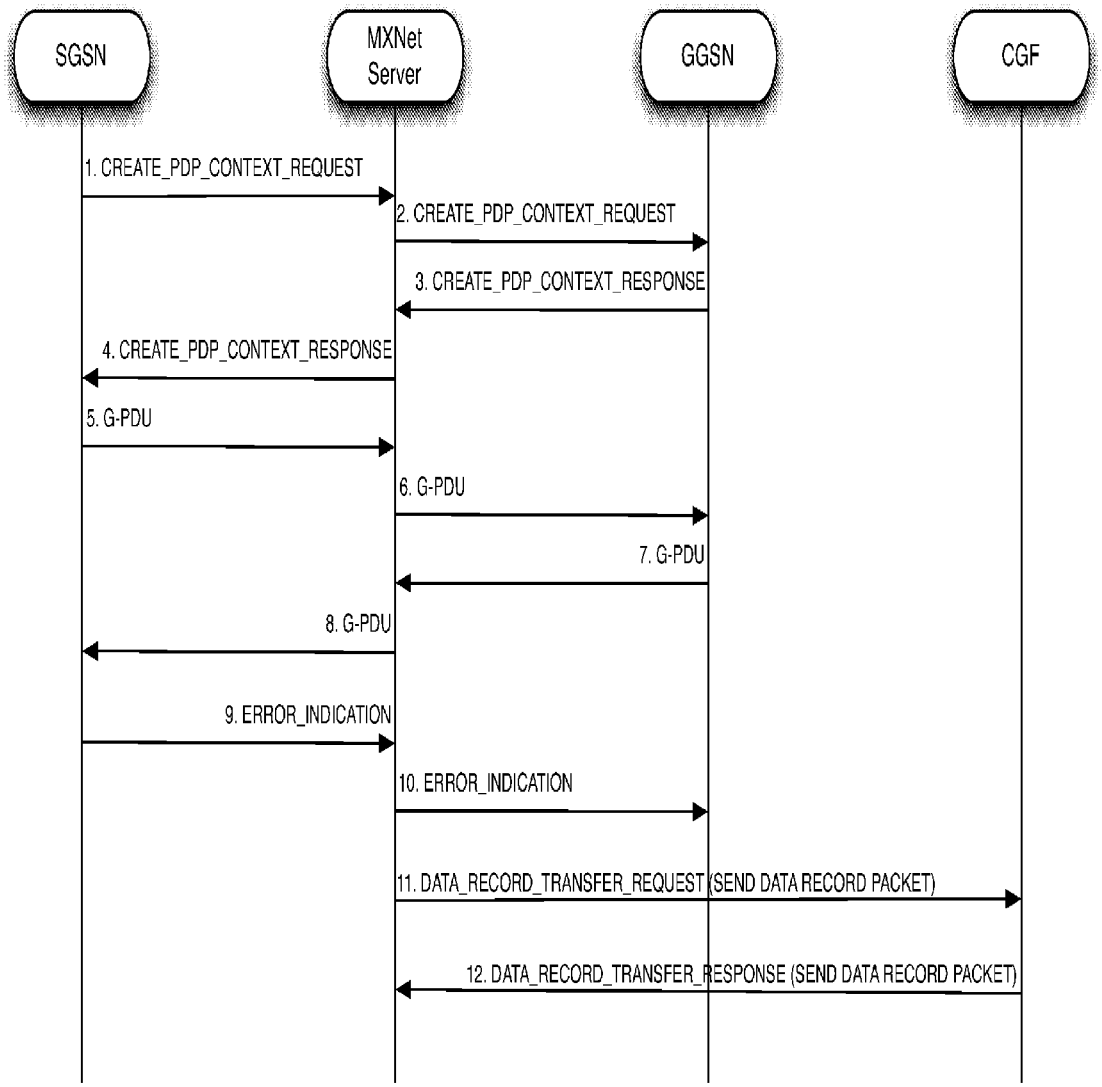
FIG. 7 is a signal flow diagram of the "Error Indication from SGSN triggering CDR generation".

Reference is made to FIG. 7, which shows an example system and method for triggering a G-CDR generation by an error indication from a SGSN. In step 1, a SGSN sends a first Create PDP Context Request message to a MXNet Server. The MXNet Server imitates the GGSN and receives the first Create PDP Context Request message. The MXNet Server retrieves PDP context information from the first Create PDP Context Request message. This retrieval is performed in order to fetch the following parameters, for example, so that a G-CDR may be generated: Served IMSI, SGSN Address, APN Identifier, PDP type, Dynamic Address flag, Charging characteristics, and a SGSN PLMN identifier. In step 2, the MXNet Server sends a second Create PDP Context Request message to the GGSN using the parameters intercepted from the first Create PDP Context Request message sent from the SGSN. The second Create PDP Context Request message is similar to the first Create PDP Context Request message, except that the Served IMSI is replaced with the Virtual IMSI of the phone borrower. In step 3, the GGSN sends a first Create PDP Context Response message to the MXNet Server after allocating the dynamic address. The MXNet Server retrieves the following parameters, for example, from the first Create PDP Context Response message so that a G-CDR may be generated: GGSN Address used, Served PDP Address, and Record Opening time. In step 4, the MXNet Server sends a second Create PDP Context Response message to the SGSN using the parameters intercepted from the first Create PDP Context Response message sent from the GGSN. In step 5, a first G-PDU is sent by the SGSN toward MXNet Server containing the uplink data. The MXNet Server receives the first G-PDU and extracts the "volume of data" parameter sent in the uplink direction. This information is used for filling the "list of traffic data volumes" parameter of the G-CDR. In step 6, the MXNet Server forwards a second G-PDU to the GGSN. In step 7, a first G-PDU is sent by the GGSN toward the MXNet Server containing downlink data. The MXNet Server receives the first G-PDU and extracts the "volume of data" from the first G-PDU that was sent in the downlink direction. The extracted information is used for filling the "list of traffic data volumes" parameter of the G-CDR. In step 8, the MXNet Server forwards a second G-PDU to the SGSN. In step 9, a first error Indication Message from the SGSN is intercepted by the MXNet Server. The MXNet Server checks if a PDP context exists. If the PDP context exists, the MXNet Server triggers G-CDR closure for this context by encoding the G-CDR and sending it within a Data Record transfer Request to the CGF.

1.7 Error Indication from GGSN Triggering G-CDR Creation.

Figure 8:
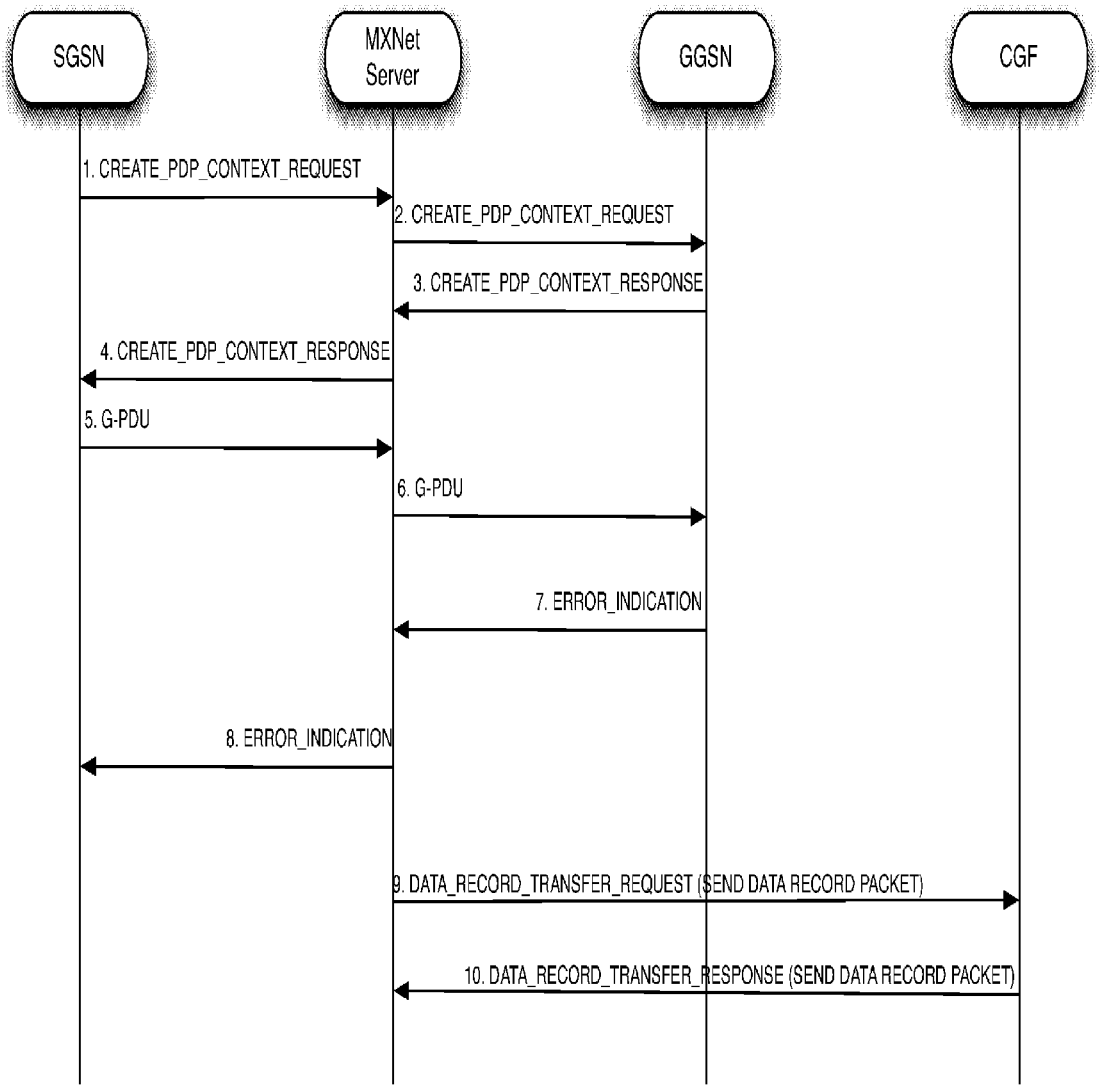
FIG. 8 is a signal flow diagram of the "Error Indication from GGSN triggering CDR generation" scenario.

Reference is made to FIG. 8, which shows an example system and method for triggering a G-CDR generation by an error indication from a GGSN. In step 1, a SGSN sends a first Create PDP Context Request message to a MXNet Server. The MXNet Server imitates the GGSN and receives the first Create PDP Context Request message. The MXNet Server retrieves PDP context information from the first Create PDP Context Request message. This retrieval is performed in order to fetch the following parameters, for example, so that a G-CDR may be generated: Served IMSI, SGSN Address, APN Identifier, PDP type, Dynamic Address flag, Charging characteristics, and a SGSN PLMN identifier. In step 2, the MXNet Server sends a second Create PDP Context Request message to the GGSN using the parameters intercepted from the first Create PDP Context Request message sent from the SGSN. The second Create PDP Context Request message is similar to the first Create PDP Context Request message, except that the Served IMSI is replaced with the Virtual IMSI of the phone borrower. In step 3, the GGSN sends a first Create PDP Context Response message to the MXNet Server after allocating the dynamic address. The MXNet Server retrieves the following parameters, for example, from the first Create PDP Context Response message so that a G-CDR may be generated: GGSN Address used, Served PDP Address, and Record Opening time. In step 4, the MXNet Server sends a second Create PDP Context Response message to the SGSN using the parameters intercepted from the first Create PDP Context Response message sent from the GGSN. In step 5, a first G-PDU is sent by the SGSN toward MXNet Server containing the uplink data. The MXNet Server receives the first G-PDU and extracts the "volume of data" parameter sent in the uplink direction. This information is used for filling the "list of traffic data volumes" parameter of the G-CDR. In step 6, the MXNet Server forwards a second G-PDU to the GGSN. A first G-PDU is sent by the GGSN toward the MXNet Server containing downlink data. The MXNet Server extracts the "volume of data" sent in the downlink direction from the G-PDU. This information is used for filling the "list of traffic data volumes" parameter of the G-CDR. The MXNet Server forwards a second G-PDU to the SGSN. In step 7, an Error Indication message sent from the GGSN is intercepted by the MXNet Server. The MXNet Server checks if the PDP context exists, and, if it exists, the MXNet Server triggers G-CDR closure for this context by encoding the G-CDR and sending it within a Data Record transfer Request to the CGF.

Method 2

Figure 9:
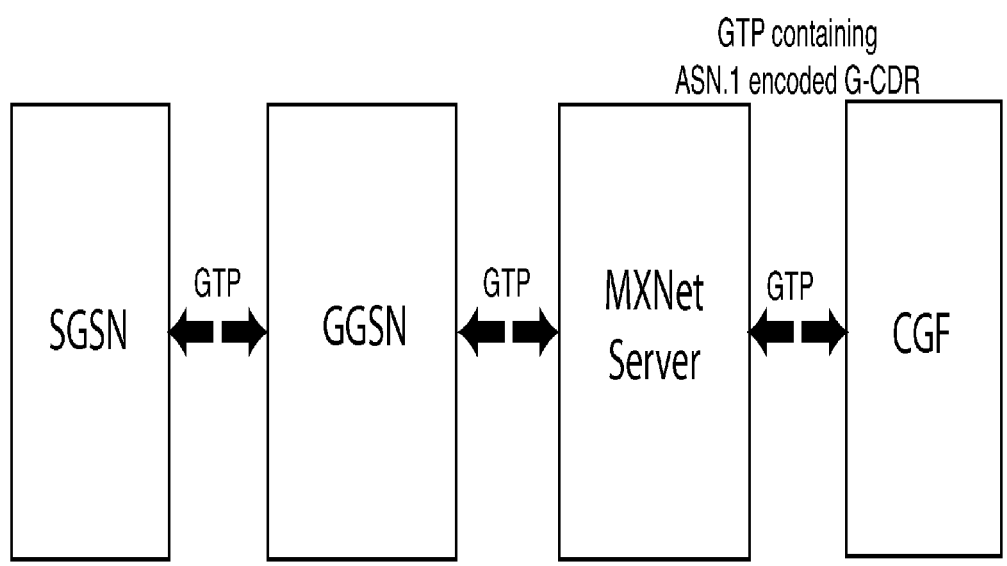
FIG. 9 is an overview diagram of Method 2 showing the logical placement of MXNet Server in between the GGSN and CGF.

Reference is made to FIG. 9. In this example, MXNet Server is responsible for decoding all CDRs and replacing an IMSI with a VIMSI. The MXNet Server then encodes the G-CDR in ASN1 format and sends it to the GGSN so that the modified CDR can be sent to the CGF.

Figure 10:
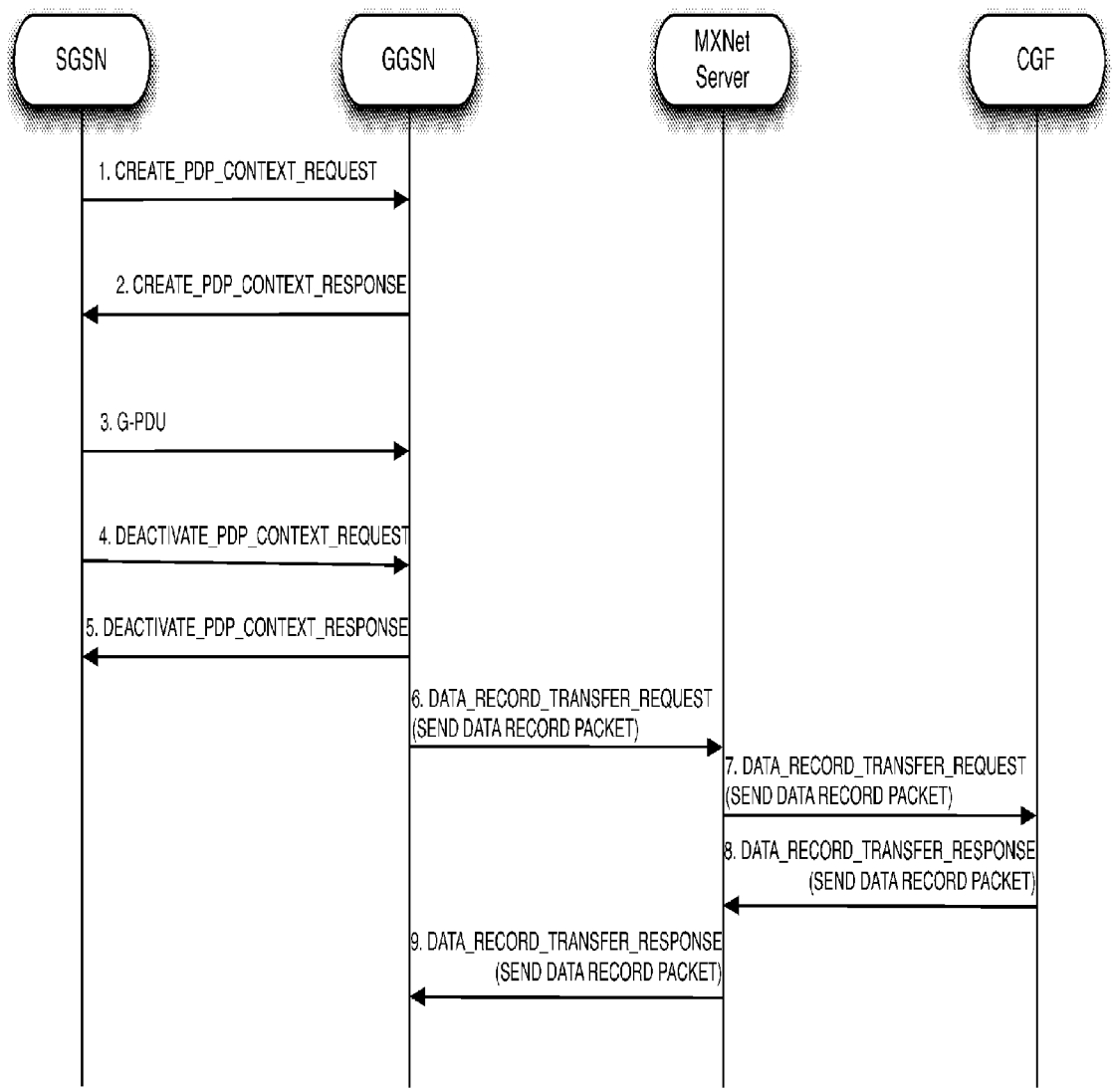
FIG. 10 is a signal flow diagram giving a typical flow of the messages between GGSN, MXNet Server and the CGF.

Reference is made to FIG. 10. In step 1, the SGSN sends a Create PDP Context Request message to the GGSN. The GGSN, after validating and verifying Create PDP Context Request message, sends a Create PDP Context Response message to the SGSN in step 2. In step 3, the SGSN starts sending uplink data. In step 4, the SGSN sends a Deactivate PDP Context Request to the GGSN. In step 5, the GGSN sends a Deactivate PDP Context Response message to the SGSN and simultaneously triggers a G-CDR towards CGF. For example, in step 6, GGSN sends a first Data Record Transfer Request message toward a MXNet Server. The first Data Record Transfer Request message contains the usage details. The MXNet Server intercepts the first Data Record Transfer Request message. The MXNet Server decodes the ASN1 G-CDR, replaces IMSI with VIMSI, and re-encodes the G-CDR before sending the CDR towards the CGF as a second Data Record Transfer Request message, as shown in step 7. In step 8, the MXNet Server receives a first Data Record Transfer Response Message from the CGF. In step 9, the MXNet Server forwards a second Data Record Transfer Response Message to the GGSN.

Other embodiments are within the scope of the following claims.

What is claimed is:

1. A method for enabling internet usage on a shared mobile device, the method comprising:
    sending a first message from a Serving GPRS Support Node (SGSN) in a telecommunication network;
    receiving the first message at a system server, wherein the first message includes an International Mobile Subscriber Identity (IMSI) relating to a first subscription;
    replacing the IMSI in the first message with a virtual IMSI thereby resulting in a second message;
    sending the second message from the system server to a Gateway GPRS Support Node (GGSN);
    sending a Call Detail Record (CDR) from the system server to a Charging Gateway Function (CGF), wherein the CDR is based on the quantity of data consumed; and
    billing an account associated with the virtual IMSI based on the CDR received at the CGF.

2. The method of claim 1, wherein the system server is a functional software module located within the GGSN.

3. The method of claim 1, wherein the system server is a functional software module located within the CGF.

4. The method of claim 1, wherein the system server is a functional software module located within a Wireless Application Protocol (WAP) Gateway.

5. The method of claim 1, wherein the system server is a functional software module located within a Mobile Internet Proxy.

6. The method of claim 1, wherein the second message further comprises a MSISDN of the phone borrower.

7. A non-transitory computer readable storage medium comprising computer executable instructions for enabling internet usage on a shared mobile device, the computer executable instructions comprising instructions for:
    sending a first message from a Serving GPRS Support Node (SGSN) in a telecommunication network;
    receiving the first message at a system server, wherein the first message includes an International Mobile Subscriber Identity (IMSI) relating to a first subscription;
    replacing the IMSI in the first message with a virtual IMSI thereby resulting in a second message;
    sending the second message from the system server to a Gateway GPRS Support Node (GGSN);
    sending a Call Detail Record (CDR) from the system server to a Charging Gateway Function (CGF), wherein the CDR is based on the quantity of data consumed; and
    billing an account associated with the virtual IMSI based on the CDR received at the CGF.

8. The non-transitory computer readable storage medium of claim 7, wherein the system server is a functional software module located within the GGSN.

9. The non-transitory computer readable storage medium of claim 8, wherein the system server is a functional software module located within the CGF.

10. The non-transitory computer readable storage medium of claim 7, wherein the system server is a functional software module located within a Wireless Application Protocol (WAP) Gateway.

11. The non-transitory computer readable storage medium of claim 7, wherein the system server is a functional software module located within a Mobile Internet Proxy.

12. The non-transitory computer readable storage medium of claim 7, wherein the second message further comprises a MSISDN of the phone borrower.

13. A system for enabling internet usage on a shared mobile device, the system comprising:
   a Serving GPRS Support Node (SGSN) that sends a first message in a telecommunication network;
   a system server that:
      receives the first message, the first message including an International Mobile Subscriber Identity (IMSI) relating to a first subscription;
      replaces the IMSI in the first message with a virtual IMSI thereby resulting in a second message;
      sends the second message to a Gateway GPRS Support Node (GGSN); and
   a Charging Gateway Function (CGF) that:
      receives a Call Detail Record (CDR) from the system server, wherein the CDR is based on the quantity of data consumed; and
      bills an account associated with the virtual IMSI based on the received CDR.

14. The method of claim 13, wherein the system server is a functional software module located within the GGSN.

15. The method of claim 14, wherein the system server is a functional software module located within the CGF.

16. The method of claim 13, wherein the system server is a functional software module located within a Wireless Application Protocol (WAP) Gateway.

17. The method of claim 13, wherein the system server is a functional software module located within a Mobile Internet Proxy.

18. The method of claim 13, wherein the second message further comprises a MSISDN of the phone borrower.

* * * * *